United States Patent [19]

Murray et al.

[11] 4,118,351

[45] Oct. 3, 1978

[54] TERPOLYAMIDE HOT MELT ADHESIVE

[75] Inventors: Christopher Linley Murray, Oldbury; Corwyn Philip Vale, Brierley Hill, both of England

[73] Assignee: British Industrial Plastics Limited, Manchester, England

[21] Appl. No.: 782,409

[22] Filed: Mar. 29, 1977

[30] Foreign Application Priority Data

Mar. 30, 1976 [GB] United Kingdom ............... 12671/76

[51] Int. Cl.² .............................................. C08G 69/14
[52] U.S. Cl. .................. 260/18 N; 428/474; 528/324; 528/331
[58] Field of Search ................... 260/78 L, 78 A, 18 N

[56] References Cited

U.S. PATENT DOCUMENTS

| | | | |
|---|---|---|---|
| 3,542,745 | 11/1970 | Snooks | 260/78 A |
| 3,790,423 | 2/1974 | Jones | 260/78 R |
| 3,919,033 | 11/1975 | Gill et al. | 260/78 A |
| 3,926,924 | 12/1975 | Edgar et al. | 260/78 A |

FOREIGN PATENT DOCUMENTS

| | | |
|---|---|---|
| 1,114,541 | 5/1968 | United Kingdom. |
| 1,114,542 | 5/1968 | United Kingdom. |
| 1,246,898 | 9/1971 | United Kingdom. |

OTHER PUBLICATIONS

Polyamide Resins–Floyd, 1966, pp. 178–179.

*Primary Examiner*—Harold D. Anderson
*Attorney, Agent, or Firm*—John T. Synnestvedt; Charles H. Lindrooth

[57] ABSTRACT

A polymeric amide which comprises:
  (i) from 30% to 60% by weight of units derived from $\epsilon$-caprolactam or $\epsilon$-aminocaproic acid
  (ii) from 25% to 55% by weight of units derived from equimolar quantitites of hexamethylene diamine and isophthalic acid and
  (iii) from 5% to 35% by weight of units derived from equimolar quantities of hexamethylene diamine and adipic acid.

The polymeric amide can be used as a hot melt adhesive.

14 Claims, No Drawings

TERPOLYAMIDE HOT MELT ADHESIVE

This invention concerns improvements in or relating to hot melt adhesive compositions.

Polyamides are used as hot melt adhesives for textiles to fuse interlinings to face fabrics to impart stiffening to the latter. Generally, the interlining manufacturer sells interlinings, already coated with a uniform distribution of adhesive spots, to garment manufacturers, who cut pieces of the required shape and size and adhere them to the face fabric in a heated press.

The principal properties required of the adhesive are:
(i) a softening point less than 150° C., preferably 100°-130° C.;
(ii) flexibility;
(iii) a viscosity sufficiently low when heated and pressed to enable the adhesive to flow without penetrating the face fabric — normally 1,000 to 20,000 poise at 150° C.
(iv) resistance to dry-cleaning fluids, e.g. perchlorethylene or trichlorethylene.
(v) resistance to warm water
(vi) the capability of being produced in or ground to a free-flowing fine powder.

Theoretically, many thousands of combinations of polyamide monomers are possible, giving copolymers, terpolymers and higher polymers. Not all are suitable for hot melt applications, and many that are deemed suitable do not meet all of the above requirements.

For example, two-component systems generally comprise a lactam and a nylon salt or a mixture of a lactam and an amino acid. The melting points of such systems are usually too high (150°-160°) for hot melt adhesive use with textiles, unless the systems are heavily plasticized (up to 50% by weight of a plasticizer) in which case the plasticizer can be leached out by dry cleaning fluids. For three-component systems, the components are usually selected from (a) lactams or amino acids;
(b) polyamide salts: $NH_2-[(CH_2)x-NHCO-(CH_2)y]-COOH$ when $x = 2-6$ and $y = 4-10$;
(c) polyamide salts from substituted diamines (eg trimethylhexamethylene diamine), cycloaliphatic diamines (eg isophorone diamine), substituted aliphatic dicarboxylic acids (eg trimethyl adipic acid), and aromatic diamines (e.g. xylylene diamine); and
(d) polyamide salts of a diamine and a dimer acid The most satisfactory systems usually consist of from 20 to 40 percent by weight of "nylon 6" units, 20 to 40 percent by weight of "nylon 66" units and 40 percent by weight of "nylon 10, 11 or 12" units.

According to the present invention, a polymeric amide comprises
(i) from 30% to 60% by weight of units derived from ε-caprolactam or ε-aminocaproic acid
(ii) from 25% to 55% by weight of units derived from equimolar quantities of hexamethylene diamine and isophthalic acid and
(iii) from 5% to 35% by weight of units derived from equimolar quantities of hexamethylene diamine and adipic acid.

Preferably the polymer comprises from 40 to 50% of the units from ε-caprolactam or ε-aminocproicacid, 30 to 40% of the units derived from equimolar quantities of isophthalic acid and hexamethylene diamine, and 10 to 30% by weight of the other units. More preferably the terpolymer comprises 45% of the units derived from ε-caprolactam or 68 -aminocaproic acid, 35% of the units derived from equimolar quantities of isopthalic acid and hexamethylene diamine and 20% by weight of the units derived from adipic acid and hexamethylene diamine.

In producing the terpolymer the starting materials for polymerization are preferably ε-caprolactam, a hexamethylene isophthalamide salt and a hexamethylene adipamide salt. In cases where ε-caprolactam is used from 0 to 4%, preferably, 3.8% of amino-caproic acid, by weight of the total ε-caprolactam and ε-aminocaproic acid is preferably included to initiate polymerisation of the ε-caprolactam. A small additional amount, for example from 0.5% to 4%, preferably from 1 to 2.5%, by weight of the total of a mono-or di-carboxylic acid (e.g. benzoic, stearic, adipic, azelaic or sebacic acid) may be included as a chain terminator to control the molecular weight and viscosity, the amount added varying according to the acid used.

If desired the hexamethylene isophthalamide and/or the hexamethylene adipamide starting materials may be replaced by equimolar quantities of their constituents i.e., hexamethylene diamine plus isophthalic acid and hexamethylene diamine plus adipic acid.

The terpolymer may have a melting point of from 95° C. to 135° C., preferred ones having a melting point of from 100° to 125° C., more preferably 105° to 110° C., and a melt flow index of from 20 to 50 g/10 min at 190° C., 2.16 kg load, more preferably 25 to 35 g/10 min, measured using an instrument in accordance with I.S.O. recommendation No. R.1133 (Ref. No. ISO/R1133-1969(E)) with a die orifice diameter of 2.10mm.

The following examples are given to illustrate the invention in greater detail, parts and percentages being weight unless otherwise stated.

EXAMPLE A

Hexamethylene isophthalamide salt was produced as follows. 400 parts of a 60% aqueous solution of hexamethylene diamine (containing 2.07 moles of the diamine) were diluted with 300 cm$^3$ of a 70/30 (v/v) ethanol/water mixture and 332 parts (2 moles) of isophthalic acid were gradually added with stirring. Exothermic heat of solution occurred, raising the temperature to 60° C. On cooling the solution, crystalline hexamethylene isophthalamide salt precipitated. The precipitate was purified by recrystallisation from 70/30 (v/v) ethanol/water mixture, the solution being clarified with activated carbon. The resultant crystalline product had a melting point of 160° to 165° C.

EXAMPLES 1 to 9

The compositions shown in Table I were produced by charging the raw materials to a polymerisation vessel provided with a nitrogen blanket and heating the charge stepwise as follows, the water of condensation evolved being collected during steps 2 to 4:
1. Temperature raised from 25° C. to 160° C. over 1 hour
2. Temperature raised from 160° to 180° C. over 1 hour
3. Temperature raised from 180° C. to 200° C. over 1 hour
4. Temperature quickly raised to 220° to 240° C. and held there for 1 hour
5. Temperature quickly raised to 260° to 270° C. and held there for 3 to 4 hours All the steps were effected at atmospheric pressure, but it may be desirable to carry out the final step at reduced pressure. The resultant terpolymers, which were clear and transparent, were allowed to cool and were then ground to a fine powder passing a 60 mesh sieve. These can be used for purposes other than as hot melt adhesives, for example as mouldings, extrusions, coatings and films. But were found particularly effective as hot melt adhesives applied by a standard perforated screen method.

In the latter method the finely powdered polymer is spread onto a substrate to be bonded, e.g. a textile interlining for suiting, and fused to the substrate by heating in an oven, e.g. at 150° C. The substrate to be bonded is then pressed to the material to which it is to be bonded, e.g. a textile suiting, in a heat transfer press and heated to a rather higher temperature, e.g. 170° C. to complete the bonding process.

Table 1

| Example | Raw Materials Composition % | | | $ACA^{(d)}$ % on capro- lactam | Viscosity Stabiliser % on total of other in- gredients | | Melting Point Range ° C | Melt flow Index$^{(e)}$ |
|---|---|---|---|---|---|---|---|---|
| | $CL^{(a)}$ | $IPH^{(b)}$ | $AH^{(c)}$ | | | | | |
| 1 | 45 | 35 | 20 | 3.8 | Stearic acid | 2.0 | 100 – 115 | 22.2 |
| 2 | 45 | 35 | 20 | 3.8 | Stearic acid | 2.3 | 95 – 110 | 27.8 |
| 3 | 45 | 35 | 20 | 3.8 | Stearic acid | 2.5 | 100 – 115 | 48.6 |
| 4 | 45 | 35 | 20 | 0.0 | Stearic acid | 2.3 | 105 – 112 | 32.0 |
| 5 | 45 | 35 | 20 | 3.8 | Benzoic acid | 1.0 | 95 – 110 | 26.4 |
| 6 | 45 | 35 | 20 | 3.8 | Adipic acid | 1.2 | 105 – 115 | 25.8 |
| 7 | 45 | 35 | 20 | 3.8 | Sebacic acid | 1.6 | 105 – 110 | 22.4 |
| 8 | 50 | 30 | 20 | 3.8 | Stearic acid | 2.3 | 105 – 115 | 29.6 |
| 9 | 45 | 35 | 20 | 3.8 | Nil | | 125 – 140 | 1.1 |

(a)Cl = Caprolactam (and amine-caproic acid.)
(b)IPH = Hexamethylene isophthalamide salt.
(c)AH = Nylon 66 salt is hexamethylene adipame
(d)ACA = Amion - caproic acid
(e)Index in g/10 mins at 190°CX under 2.16 kg load. (150 test ref. 150/R1133 - 1969(E)).

What we claim is:
1. A polymeric amide consisting essentially of:
 (i) from 45% to 50% by weight of units from ε-caprolactam or ε-aminocaproic acid
 (ii) from 30% to 35% by weight of units from equimolar quantities of hexamethylene diamine and isophthalic acid and
 (iii) 20% by weight of units from equimolar quantities of hexamethylene diamine and adipic acid,
 said polymeric amide having a melting point within the range of 95° C. to 135° C.
2. A polymeric amide according to claim 1 in which the amount of units from ε-caprolactam or ε-aminocaproic acid is 45% by weight.
3. A polymeric amide according to claim 2 in which the amount of units from equimolar quantities of hexamethylene diamine and isophthalic acid is 35% by weight.
4. A polymeric amide according to claim 1 which has a melt flow index of from 20 to 50 g/10 mins. at 190° C. under a 2.16 kg. load measured using an instrument in accordance with International Standards Organization recommendation ISO/R1133-1969(E).
5. A polymeric amide according to claim 1 which has a melting point of from 100° C. to 125° C.
6. A polymeric amide according to claim 5 which has a melting point of from 105° C. to 110° C.
7. A polymeric amide according to claim 6 which has a melt flow index in the range 25 to 35 g/10 mins. at 190° C. under a 2.16 kg. load measured using an instrument in accordance with International Standards Organization recommendation ISO/R1133-1969(E).
8. A polymeric amide according to claim 1 in which is included, as a viscosity stabilizer, an additional amount of mono -or di - basic carboxylic acid which is in the range of 0.5 to 4.0% by weight of total polymer.
9. A polymeric amide according to claim 8 in which the viscosity stabilizer is selected from the group consisting of benzoic acid, stearic acid, adipic acid, azelaic acid and sebacic acid.
10. A polyamide terpolymer suitable for use as a hot melt adhesive and having a melting point within the range 95° C. to 135° C. and consisting essentially of units of the following materials, the amounts being expressed as percentage by weight of the terpolymer:
 (i) from 45% to 50% by weight of ε-caprolactam or ε-aminocaproic acid
 (ii) from 30% to 35% by weight of equimolar quantities of hexamethylene diamine and isophthalic acid
 (iii) 20% by weight of equimolar quantities of hexamethylene diamine and adipic acid and
 (iv) from 0.5 to 4.0% by weight of a chain terminator as a viscosity stabilizer.
11. A polyamide terpolymer according to claim 10 in which the amount of ε-caprolactam or ε-aminocaproic acid is 45% by weight and the amount of equimolar quantities of hexamethylene diamine and isophthalic acid is 35% by weight.
12. A polyamide terpolymer in accordance with claim 11 which has a melting point of from 105° C. to 110° C. and a melt flow index in the range 20 to 35 g/10 mins. at 190° C. under a 2.16 kg. load measured using an instrument in accordance with International Standards Organization recommendation ISO/R1133-1969(E).
13. A polyamide terpolymer in accordance with claim 12 in which is included, as a viscosity stabilizer an additional amount, in the range of 0.5 to 4.0% by weight of total polymers, of mono- or di-basic carboxylic acid selected from the group consisting of benzoic acid, stearic acid, adipic acid, azelaic acid and sebacic acid.

14. A hot melt adhesive polyamide terpolymer composition having a melting point within the range 95° C. to 135° C., a melt flow index of from 20 to 50 g/10 mins. at 190° C. under a 2.16 kg. load measured using an instrument in accordance with International Standards Organization recommendation ISO/R1133-1969(E) and consisting essentially of units of the following materials, the amounts being expressed as percentage by weight of the terpolymer:
(i) from 45% to 50% by weight of ε-caprolactam or ε-aminocaproic acid
(ii) from 30% to 35% by weight of equimolar quantities of hexamethylene diamine and isophthalic acid and
(iii) 20% by weight of equimolar quantities of hexamethylene diamine and adipic acid.

* * * * *